United States Patent
Chang et al.

(10) Patent No.: US 7,414,836 B2
(45) Date of Patent: Aug. 19, 2008

(54) AUTO-EXTENDING REPLICATOR

(75) Inventors: Pao-Shien Chang, Tao Yuan Shien (TW); Ming-Te Lin, Hsichih (TW); Yung-Lu Wu, Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 504 days.

(21) Appl. No.: 11/291,935

(22) Filed: Dec. 2, 2005

(65) Prior Publication Data

US 2007/0041156 A1 Feb. 22, 2007

(30) Foreign Application Priority Data

Aug. 16, 2005 (TW) ............... 94127930 A

(51) Int. Cl.
*G06F 1/16* (2006.01)
(52) U.S. Cl. .................................... 361/686
(58) Field of Classification Search ................. 361/686
See application file for complete search history.

(56) References Cited

U.S. PATENT DOCUMENTS

| | | | | |
|---|---|---|---|---|
| 6,697,252 B2 * | 2/2004 | Maeda | ............ | 361/686 |
| 6,724,623 B2 * | 4/2004 | Bovio et al. | ............ | 361/686 |
| 6,741,462 B2 * | 5/2004 | Kamphuis et al. | ............ | 361/686 |
| 6,744,627 B2 * | 6/2004 | Won et al. | ............ | 361/686 |
| 6,760,217 B2 * | 7/2004 | Tsai | ............ | 361/686 |
| 6,768,652 B2 * | 7/2004 | DeLuga | ............ | 361/686 |
| 6,885,552 B2 * | 4/2005 | Mullen et al. | ............ | 361/686 |
| 6,912,125 B2 * | 6/2005 | Weng | ............ | 361/686 |
| 6,952,344 B2 * | 10/2005 | Weng | ............ | 361/686 |
| 7,038,908 B2 * | 5/2006 | Usui et al. | ............ | 361/686 |
| 7,061,757 B2 * | 6/2006 | Kuo et al. | ............ | 361/686 |
| 7,079,385 B1 * | 7/2006 | Cheng et al. | ............ | 361/686 |
| 7,110,252 B2 * | 9/2006 | Liang et al. | ............ | 361/686 |
| 7,142,421 B2 * | 11/2006 | Cheng et al. | ............ | 361/686 |
| 7,283,357 B2 * | 10/2007 | Kim | ............ | 361/686 |
| 7,286,344 B2 * | 10/2007 | Kim | ............ | 361/686 |
| 7,379,295 B2 * | 5/2008 | Ke | ............ | 361/686 |
| 2004/0075980 A1 * | 4/2004 | Park | ............ | 361/686 |

* cited by examiner

*Primary Examiner*—Lisa Lea-Edmonds
(74) *Attorney, Agent, or Firm*—Rabin & Berdo, PC

(57) ABSTRACT

An auto-extending replicator includes a replicator body, a forcing mechanism, an extended unit and a control mechanism. The extended unit includes an extended body and a blocking member. The forcing mechanism connected between the replicator body and the extended body exerts a force on the extended body along a direction of extending. The blocking member connected with the extended body has a stepped structure. A control mechanism second end blocks the blocking member from extending out. When a control mechanism first end is displaced, a contact position between the blocking member and the control mechanism second end is changed so that the extended body together with the blocking member move extendedly along the direction of extending.

18 Claims, 3 Drawing Sheets

AUTO-EXTENDING REPLICATOR

RELATED APPLICATIONS

The present application is based on, and claims priority from, Taiwan Application Serial Number 94127930, filed Aug. 16, 2005, the disclosure of which is hereby incorporated by reference herein in its entirety.

BACKGROUND

1. Field of Invention

The present invention relates to an auto-extending replicator. More particularly, the present invention relates to an auto-extending replicator applicable to a portable electrical apparatus.

2. Description of Related Art

To meet consumers' demand for portability of electrical apparatuses, the design of portable electrical apparatuses has been trending to lighter weight and smaller scale, resulting in lack of extensibility such as for external connection to peripheral devices. A port replicator has thus been developed for such an apparatus as a notebook computer, providing various functions and more connections for additional hardware, such as a video output connector, USB port connector, network port connector or other input/output connector for peripheral devices.

Most conventional replicators are exclusively sized; for example, a 14-inch notebook and a 17-inch notebook correspond to different replicators respectively. Therefore, utilization of the replicator is limited. Other conventional replicators are available, which are manually extendable. In this case, an extended body of a replicator must be pulled out manually in order to match the size of the apparatus such as a notebook, which is inconvenient for users.

For the foregoing reasons, there is a need for a replicator applicable to several electrical apparatuses of different dimensions.

SUMMARY

It is therefore an aspect of the present invention to provide an auto-extending replicator having several extension modes.

It is another aspect of the present invention to provide an auto-extending replicator whose dimension is variable to match different portable electrical apparatuses.

It is another aspect of the present invention to provide an auto-extending replicator which is able to extend automatically in dimension to match the used electrical apparatus without need for manipulation.

In accordance with the foregoing and other aspects of the present invention, an auto-extending replicator is provided. The auto-extending replicator includes a replicator body, a forcing mechanism, an extended unit and a control mechanism. The extended unit includes an extended body and a blocking member. The forcing mechanism is connected between the replicator body and the extended body, exerting a force on the extended body along a direction of extending. The blocking member is connected with the extended body and has a stepped structure.

The control mechanism includes a control mechanism first end and a control mechanism second end for blocking the blocking member to prevent the extended body from extending out. When the control mechanism second end is displaced, for example, by an external contact member such as a lever, and then a contact position with respect to the blocking member is changed, the extended body together with the blocking member move along the direction of extending by the force from the forcing mechanism.

According to a preferred embodiment, the replicator further includes a mechanism for restoring the extended body. The mechanism includes a driving unit, a first transmission mechanism, a linked unit and a second transmission mechanism. The first transmission mechanism is connected between the driving unit and the linked unit; and the second transmission mechanism is connected to the linked unit for restoring the extended body. When the driving unit is displaced and moves the linked unit through the first transmission mechanism, the linked unit returns the extended body through the second transmission mechanism.

In conclusion, the present invention allows an automatic extension motion and a correct match between an apparatus and the replicator. Expansibility of a portable electrical apparatus is thus raised and the cost of extension is greatly reduced. The feature of the automatic extension, unlike a conventional way of manipulation, provides a great convenience to users and saves users much manipulating time. A further convenience is also obtained in that separation from the apparatus and restoration of the extended body occur simultaneously through a returning mechanism.

It is to be understood that both the foregoing general description and the following detailed description are by examples and are intended to provide further explanation of the invention as claimed.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1:
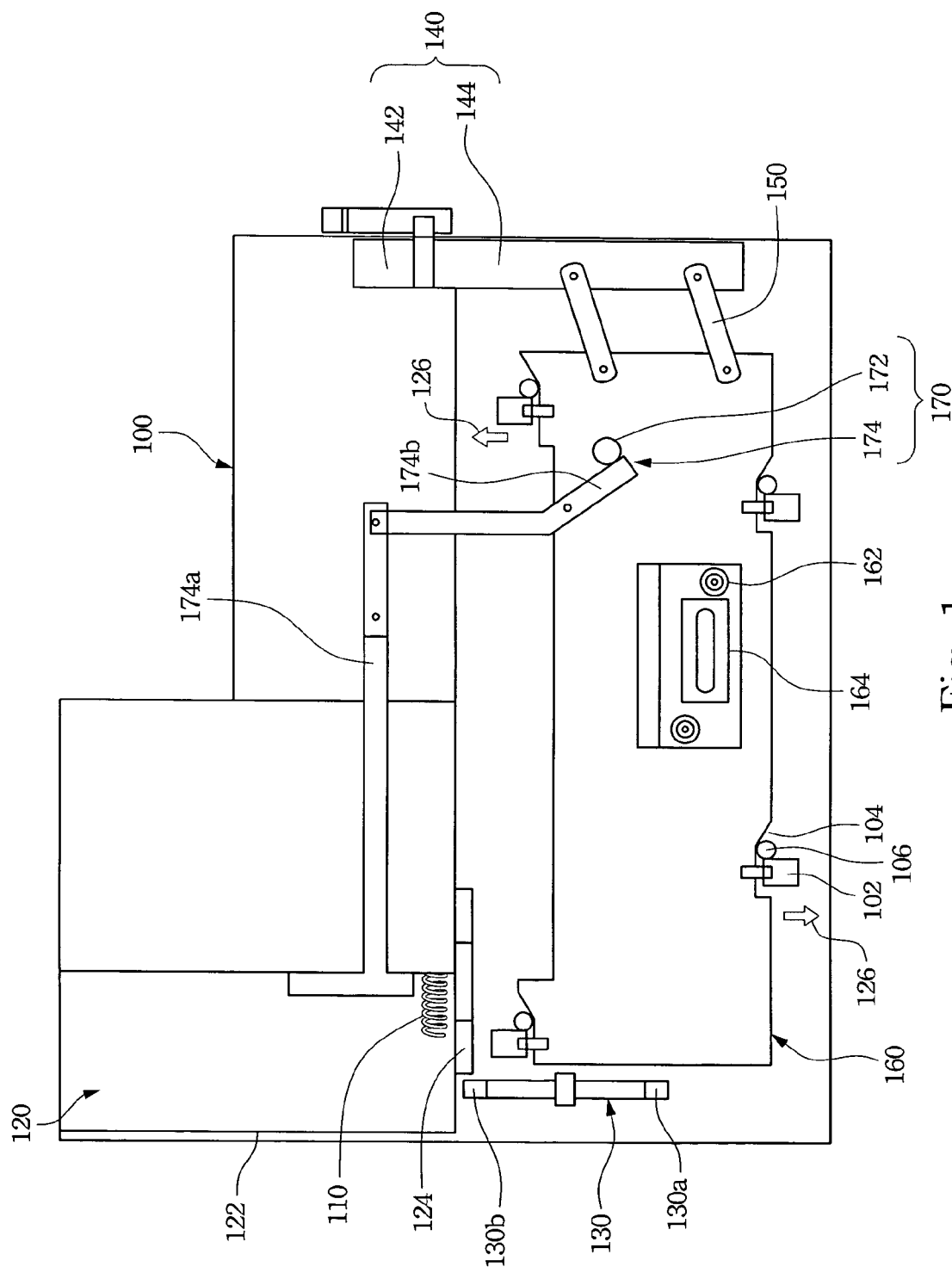
FIG. 1 is a schematic diagram of a configuration of an auto-extending replicator in accordance with a preferred embodiment of the present invention.

The present invention discloses an auto-extending replicator which automatically extends an extended body and achieves a dimensional match when connected with an electrical apparatus such as a notebook. Through a control mechanism and a block mechanism, the present invention fulfills an automatic extension movement of an extended body for properly matching the dimension of an apparatus.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a configuration of an auto-extending replicator in accordance with a preferred embodiment of the present invention. An auto-extending replicator includes a replicator body 100, a forcing mechanism 110, an extended unit 120 and a control mechanism 130.

The extended unit 120 includes an extended body 122 and a blocking member 124. The forcing mechanism 110 is connected to the replicator body 100 and the extended body 122 with both ends and exerts a force on the extended body 122 along a direction of extending. The blocking member 124 connected with the extended body 122 has a stepped structure with a plurality of steps, and each step is at a distinct height.

The control mechanism 130 includes a control mechanism first end 130a and a control mechanism second end 130b, and the control mechanism second end 130b is for blocking the blocking member 124 to prevent the extended body 122 from extending out. When the control mechanism second end 130b is displaced whereby a contact position is changed, such as by an external contact member 212 (shown in FIG. 2), the extended body 122 together with the blocking member 124 move along the direction of extending by the force from the forcing mechanism 110. The external contact member 212 may be a rotatory control lever. Herein, the control lever means that the lever is used to control the displacement of the ends of the control mechanism, thereby defining the extent to which the extended body moves extendedly.

In the embodiment, the control mechanism 130 is a rotatory lever, and the control mechanism first end 130a and the control mechanism second end 130b correspond to both ends of the rotatory lever respectively, that is, a rotatory lever first end and a rotatory lever second end. The control mechanism second end 130b blocks the blocking member 124 to prevent an extension of the extended body 122.

When the control mechanism first end 130a is displaced whereby the control mechanism 130 rotates, the control mechanism second end 130b is also displaced at a first predetermined distance B (not shown) so that the contact position with respect to the blocking member 124 is changed. Simultaneously, both of the blocking member 124 and the extended body 122 move extendedly by the forcing mechanism 110.

The forcing mechanism 110 may be a spring connected between the extended body 122 and the replicator body 100 and applies a spring force to the extended body 122 accommodated within the replicator body 100.

Figure 2:
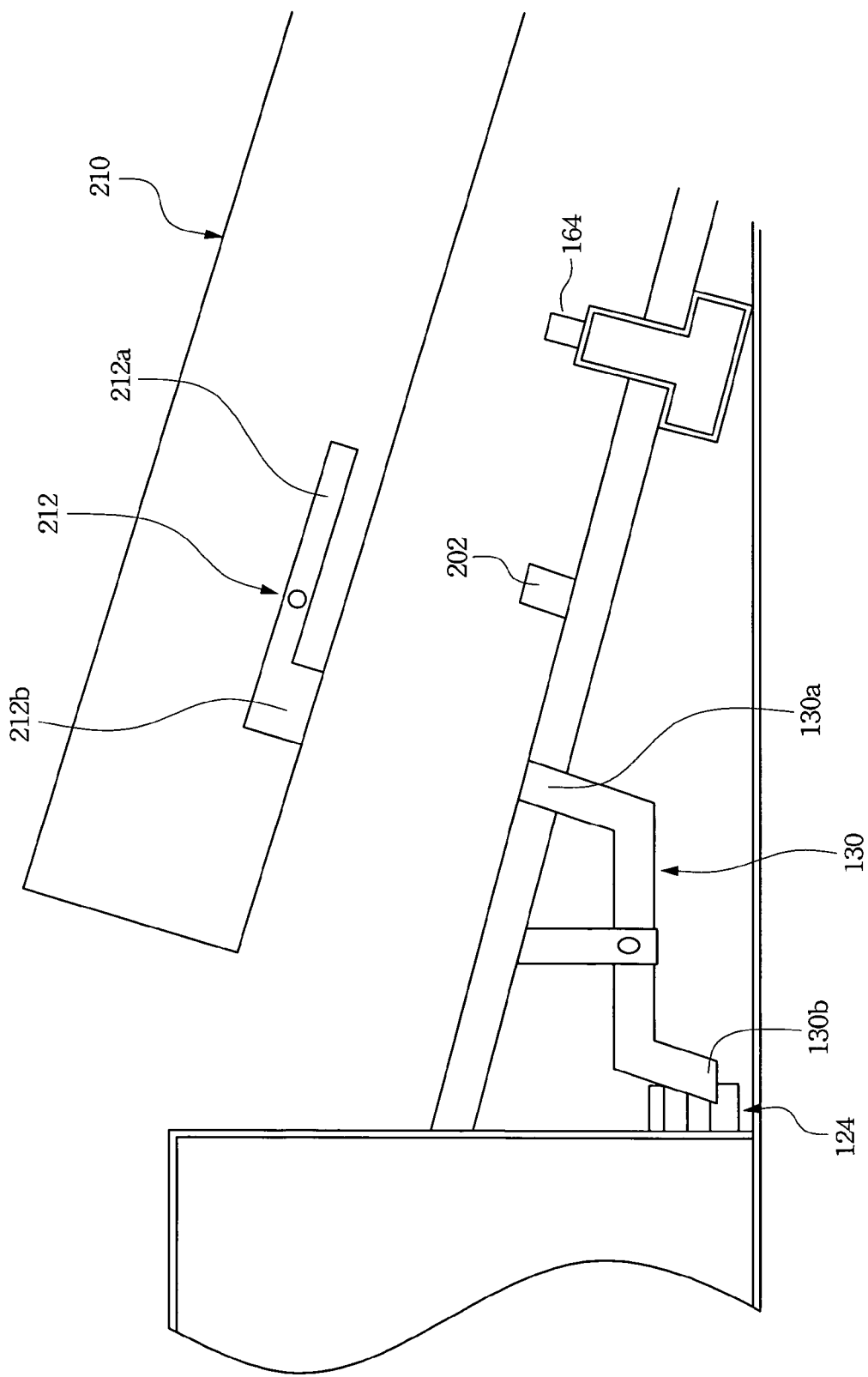
FIG. 2 is a side view of the auto-extending replicator in accordance with a preferred embodiment of the present invention.

Reference is also made to FIG. 2, which illustrates a side view of the auto-extending replicator in accordance with a preferred embodiment of the present invention. In the embodiment, the extended body 122 is accommodated within the replicator body 100, and the replicator body 100 further includes a projection 202.

An apparatus body 210 such as a notebook includes an external contact member 212. The external contact member 212 may be a rotatory control lever whose arrangement depends on the electrical apparatus. The arrangement determines the displacements of two ends of the control lever and also indirectly determines a displacement of the control mechanism second end 130b, that is, the first predetermined distance B.

When the replicator body 100 is not combined with the apparatus body 210, the control mechanism second end 130b contacts the blocking member 124 at a lowest block position 124a (shown in FIG. 3), that is, an initial contact position of the control mechanism 130 with respect to the blocking member 124 when the replicator is unused, and prevents the extended body 122 from extending out. In such a situation, the replicator less voluminous and might correspond to a 12-inch notebook computer as the apparatus body.

When the replicator body 100 is combined with the apparatus body 210, a control lever first end 212a of the external contact member 212 is rotated by pressing against the projection 202. A control lever second end 212b is also rotated until contacting the control mechanism first end 130a, then causing the control mechanism 130 to rotate. The rotation of the control mechanism 130 causes a displacement of the control mechanism second end 130b by the first determined distance B so that control mechanism second end 130b leaves the lowest block position 124a.

At the moment of the control mechanism 130 leaving the initial contact position, the blocking member 124 loses a resistive force against the force from the forcing mechanism 110, and the extended body 122 consequently extends out along the force direction of the forcing mechanism 110 until the blocking member 124 again contacts the control mechanism 130 at a second block position 124b and stops the extending movement. In other words, a position at which the control mechanism 130 contacts the blocking member 124 after contact is different from the one before contact.

Another version of the invention defines that the extended body is connected with a plurality of blocking members, each of which is located at a distinct length and provides the same function as that mentioned above.

In the FIG. 1, a driving unit 140 including a rolling member 142 and a transmission member 144 is shown.

In the embodiment, the replicator further includes a mechanism for returning the extended body 122. The mechanism includes a driving unit 140, a linked unit 160 and a second transmission mechanism 170 for returning the extended body 122. The driving unit 140 is for driving the linked unit 160 to move and the second transmission mechanism 170 is connected with the linked unit 160. When driven by the driving unit 140, the linked unit 160 allows the second transmission mechanism 170 to return the extended body 122.

A first transmission mechanism 150 is further included in the embodiment, which is connected between the driving unit 140 and the linked unit 160 and moves the linked unit 160 in response to the motion of the driving unit 140. The driving unit 140 includes a rolling member 142 and a transmission member 144. The rolling member 142 is for moving the transmission member 144, and the transmission member 144 is connected with the first transmission mechanism 150.

The first transmission mechanism 150 may be a link with both ends pivoted at the transmission member 144 and the linked unit 160 respectively. The linked unit 160 is restricted to move in a single direction. For example, a trench (not shown) can be set on the linked unit 160, extending along a direction perpendicular to the movement of the transmission member 144; and a restricting part (not shown) is fixed on the replicator body 100 and interposed within the trench so that the linked unit 160 is restricted to move along the trench.

The second transmission mechanism 170 includes a protrusion 172 and a returning member 174. The returning member 174 is pivotable. For example, the returning member 174 is pivoted on the replicator body 100 and includes a driven part 174a and a returning part 174b. The returning part 174b is for pulling back the extended body 122 and the protrusion 172 is disposed on the linked unit 160 for pushing and driving the driven part 174a. When the protrusion 172 pushes the driven part 174a so that the returning member 174 rotates, the returning part 174b pulls the extended body 122 back.

The replicator body 100 further includes a lock 102 for retaining the apparatus body 210, which is restricted to move in a single direction. The linked unit 160 further includes a bevel 104 for pushing the lock 102 away. Preferably, a roller 106 is also included, adjacent and coupled to the lock 102. In operation, the bevel 104 pushes the roller 106 and subsequently the roller 106 pushes the lock 102 away. Through the roller 106, the lock 102 can be smoothly moved away from retaining the apparatus body 210. Movement of the lock 102 is indicated by an arrow 126.

When the apparatus body 210 is to be separated from the replicator body 100, the rolling member 142 is activated first to displace the transmission member 144. Through the first transmission mechanism 150, the linked unit 160 moves in response to the movement of the transmission member 144 along the trench due to a restriction defined by the trench and the restricting part. Then, the lock 102 is pushed by the bevel 104 of the linked unit 160 and moves along the restricting direction until the apparatus body 210 is released from retention. The linked unit 160 further includes an eject member 162 which is restricted to move along a direction of ejecting the apparatus body 210. By movement of the linked unit 160, the eject member 162 moves to eject the apparatus body 210 from the connector 164. Simultaneously, the protrusion 172 follows the movement of the linked unit 160 until pushing the driven part 174a of the returning member 174 so that the returning member 174 is rotated and the returning part 174b pulls the extended body 122 along the opposite direction of the force from the forcing mechanism 110.

While the extended body 122 is pulled, the blocking member 124 is also displaced along the same direction due to their structural connection and is free from contact with the control mechanism second end 130b. In such a separation, the control lever first end 212a returns back and no longer contacts the projection 202, nor does the control lever second end 212b contact the control mechanism first end 130a; therefore, the control mechanism 130 rotates to the original position.

When the rolling member 142 is restored, the transmission member 144 also returns, which promotes the return movements of the linked unit 160 and the protrusion 172. The returning member 174 thus is not pushed by the protrusion 172 and stops pulling the extended body 122. Although the forcing mechanism 110 still exerts a force on the extended body 122, the control mechanism second end 130b blocks the blocking member 124 at the lowest block position 124a because the control mechanism 130 returns to the lowest block position 124a (initial contact position) and is not displaced by the control lever, that is, the external contact member 212. Therefore the extended body 122 is restored.

Figure 3:
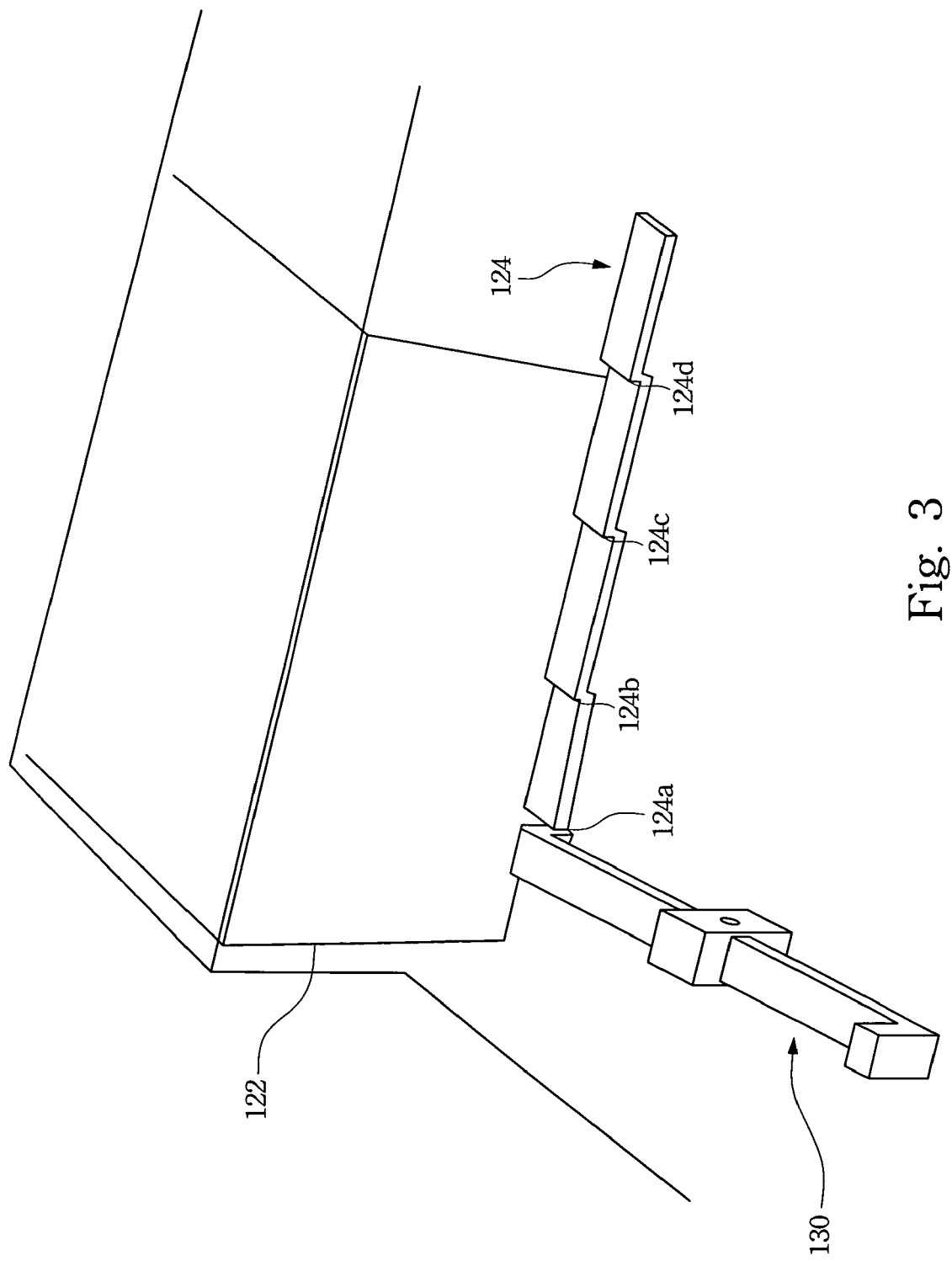
FIG. 3 is a schematic diagram of a blocking member in accordance with a preferred embodiment of the present invention.

Reference is now made to FIG. 3, illustrating a schematic diagram of a blocking member in accordance with a preferred embodiment of the present invention. The blocking member 124 of the auto-extending replicator has a stepped structure. The lowest block position 124a refers to a last level of the structure, that is, the initial contact position at which the control mechanism second end 130b contacts the blocking member 124 when the extended body 122 is not extended yet.

In the embodiment, each level section is used as a block position. Other block positions are also shown: a second block position 124b, a third block position 124c and a fourth block position 124d, each corresponding to a specific extending dimension.

It should be noted that the blocking member is not limited to the one having four block positions described above; the amount of the levels of the structure can be modified according to demands.

The present invention has at least the following advantages. The auto-extending replicator is applicable to several apparatuses with different dimensions such as a 12-inch, 14-inch, 15-inch or 17-inch notebook computer, which provides individual extension modes for all products. Therefore, cost of extension is reduced for users.

Compared to the conventional manual adjustment, the automatic extension movement of the replicator of the invention is more convenient and quicker for users. When combined with the electrical apparatus, a properly corresponding extension is obtained by cooperation of the mechanisms. The present invention is also convenient for simultaneous restoration of the extended body and separation between the apparatus and the replicator.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An auto-extending replicator applicable to a portable electrical apparatus, comprising:
   a forcing mechanism;
   a replicator body connected with an end of the forcing mechanism;
   an extended unit, comprising:
      an extended body connected with another end of the forcing mechanism, the forcing mechanism exerting a force on the extended body along a direction of extending; and
      a blocking member with a stepped structure connected to the extended body; and
   a control mechanism, wherein an end of the control mechanism blocks the blocking member to prevent the extended body from extending out, and when the end of the control mechanism is displaced and loses contact with the blocking member, the extended body together with the blocking member move along the direction of extending by the force.

2. The replicator of claim 1, wherein the forcing mechanism is a spring.

3. The replicator of claim 1, wherein the control mechanism is a rotatory lever, and when an external contact member contacts and rotates the control mechanism, the end of the control mechanism is displaced.

4. The replicator of claim 3, wherein the replicator body comprises a projection for displacing the external contact member to contact and rotate the rotatory lever.

5. The replicator of claim 1, further comprising:
   a driving unit;
   a first transmission mechanism connected with the driving unit;
   a linked unit connected to the first transmission mechanism; and
   a second transmission mechanism connected to the linked unit for returning the extended body,
   wherein when the driving unit is displaced and pushes the linked unit through the first transmission mechanism, the linked unit returns the extended body through the second transmission mechanism.

6. The replicator of claim 5, wherein the driving unit comprises a transmission member connected to the first transmission mechanism and a rolling member for moving the transmission member.

7. The replicator of claim 6, wherein the first transmission mechanism is a link pivoted at the transmission member and the linked unit.

8. The replicator of claim 5, wherein the second transmission mechanism comprises:
   a returning member pivoted on the replicator body and having a driven part and a returning part; and
   a protrusion fixed on the linked unit for pushing against the driven part to rotate the returning member,
   wherein when the returning member is rotated, the returning part pulls the extended body back.

9. The replicator of claim 1, wherein the replicator body comprises a lock for retaining an apparatus body and the linked unit comprises a bevel for pushing the lock away.

10. The replicator of claim 1, wherein the replicator body comprises a roller coupled with the lock for pushing the lock.

11. An auto-extending replicator for a notebook, comprising:
a replicator body;
a forcing mechanism connected with the replicator body;
an extended unit, comprising:
   an extended body connected with the forcing mechanism, the forcing mechanism exerting a force on the extended body along a direction of extending; and
   a blocking member with a stepped structure connected to the extended body;
a rotatory lever having a rotatory lever first end and a rotatory lever second end blocking the blocking member to prevent the extended body from extending out, when the rotatory lever first end being pushed by an external contact member of the notebook to rotate the rotatory lever, the rotatory lever second end being displaced and the extended body together with the blocking member moving along the direction of extending by the force;
a second transmission mechanism for restoring the extended body;
a linked unit connected with the second transmission mechanism;
a first transmission mechanism connected to the linked unit; and
a driving unit connected to the first transmission mechanism,
wherein when the driving unit is displaced and pushes the linked unit through the first transmission mechanism, the linked unit returns the extended body through the second transmission mechanism.

12. The replicator of claim 11, wherein the forcing mechanism is a spring.

13. The replicator of claim 11, wherein the replicator body comprises a projection for displacing the external contact member to contact and activate the rotatory lever.

14. The replicator of claim 11, wherein the driving unit comprises a transmission member connected to the first transmission mechanism and a rolling member for moving the transmission member.

15. The replicator of claim 11, wherein the first transmission mechanism is a link pivoted at the transmission member and the linked unit.

16. The replicator of claim 11, wherein the second transmission mechanism comprises:
a returning member pivoted on the replicator body and having a driven part and a returning part; and
a protrusion fixed on the linked unit for pushing against the driven part to rotate the returning member,
wherein when the returning member is rotated, the returning part pulls the extended body back.

17. The replicator of claim 11, wherein the replicator body comprises a lock for retaining the notebook and the linked unit comprises a bevel for pushing the lock away.

18. The replicator of claim 11, wherein the replicator body comprises a roller coupled with the lock for pushing the lock.

* * * * *